United States Patent [19]
Johnson

[11] 3,944,199
[45] Mar. 16, 1976

[54] WORK HOLDER AND CATCH PAN
[76] Inventor: Ernst S. Johnson, 515 Garwood St., Oakhurst, N.J. 07755
[22] Filed: July 10, 1975
[21] Appl. No.: 594,778

[52] U.S. Cl. .............................................. 269/15
[51] Int. Cl.² .......................................... B23Q 3/00
[58] Field of Search ................. 269/15, 13; 214/300

[56] References Cited
UNITED STATES PATENTS

| | | | |
|---|---|---|---|
| 1,350,119 | 8/1920 | Staley | 269/15 |
| 1,361,262 | 12/1920 | Jacob | 269/15 |
| 1,953,814 | 4/1934 | McDevitt | 269/15 |

*Primary Examiner*—Al Lawrence Smith
*Assistant Examiner*—Robert C. Watson
*Attorney, Agent, or Firm*—Charles F. Gunderson

[57] ABSTRACT

A work holder mounted on a catch pan or drain provides a flat grid to support an oil or grease carrying portion of a vehicle or the like. The flat grid is supported by and positioned centrally above the catch pan, which is substantially larger than the oil carrying portion of the vehicle. The catch pan is supported by a hollow central mounting tube through which any liquids collected in the pan may drain into a storage container for disposal in a routine manner. The storage container may support the mounting tube.

9 Claims, 3 Drawing Figures

WORK HOLDER AND CATCH PAN

BACKGROUND OF THE INVENTION

Vehicles, such as cars, are almost a necessity in our civilization, and their care and maintenance becomes equally vital to the civilization. Many of the services required for the maintenance of a car are routine, and functions, such as draining the crankcase of a car have been fairly well organized in most service stations. Crankcase draining is usually accomplished by the use a funnel-like receiver, positioned under a crankcase drain tap, for draining oil and residue into a storage container of any type.

Other functions such as the servicing of an automatic transmission, (where drainage plugs may not be provided), are more troublesome since they may require the removal of a bulky oil pan with the potential spillage of the oils or greases in the pan. This becomes a messy and unpleasant chore that may require two mechanics, and is usually overlooked by maintenance men. The standard funnels for collecting crankcase oils are too small to be of use here, and are otherwise inadequate.

It is therefore an object of this invention to provide the combination of a work holder to support a portion of a car, such as the oil pan of an automatic transmission — while it is being loosened or removed from a car — and a catch pan substantially larger than the oil pan to catch any spillage from the oil pan during the process.

SUMMARY OF THE INVENTION

A catch pan is provided that is substantially larger than the oil pan of an automatic transmission or the portion of a car that is being serviced. This catch pan is supported by a central, hollow mounting tube or drainpipe that can fit into the tubular receiving tube of a storage container that may be of conventional size and shape. The storage container may be supported on casters in a well known manner to be free to be moved or positioned under a car being serviced.

A work holder is provided to be supported and held securely by the catch pan. The work holder must extend far enough above the catch pan to allow access to the portion of the under body of the car that is supported by the work holder.

The central, hollow mounting tube that supports the catch pan is free to move up and down in the tubular receiving tube of the storage container to adjust the work holder to the height of the portion of the underbody that is being serviced. At this height the tubes are secured by a lock screw, or the like, to hold the assembly until the operation is completed.

The device is readily moved into position under a car being serviced, and readily adjusted to the precise height for servicing any particular portion of the car. It must be strong enough to support the portion of the car while it is being serviced, and its catch pan must be large enough to catch any and all residue from this portion of the car while it is being serviced. The residue may drain into the storage container for later disposal, or it may be retained in the catch pan for observation or reuse. The entire operation can be handled by a single mechanic, with a minimum of time on the job and a minimum of clean-up time.

DETAILED DESCRIPTION OF THE PREFERRED EMBODIMENT

Figure 1:
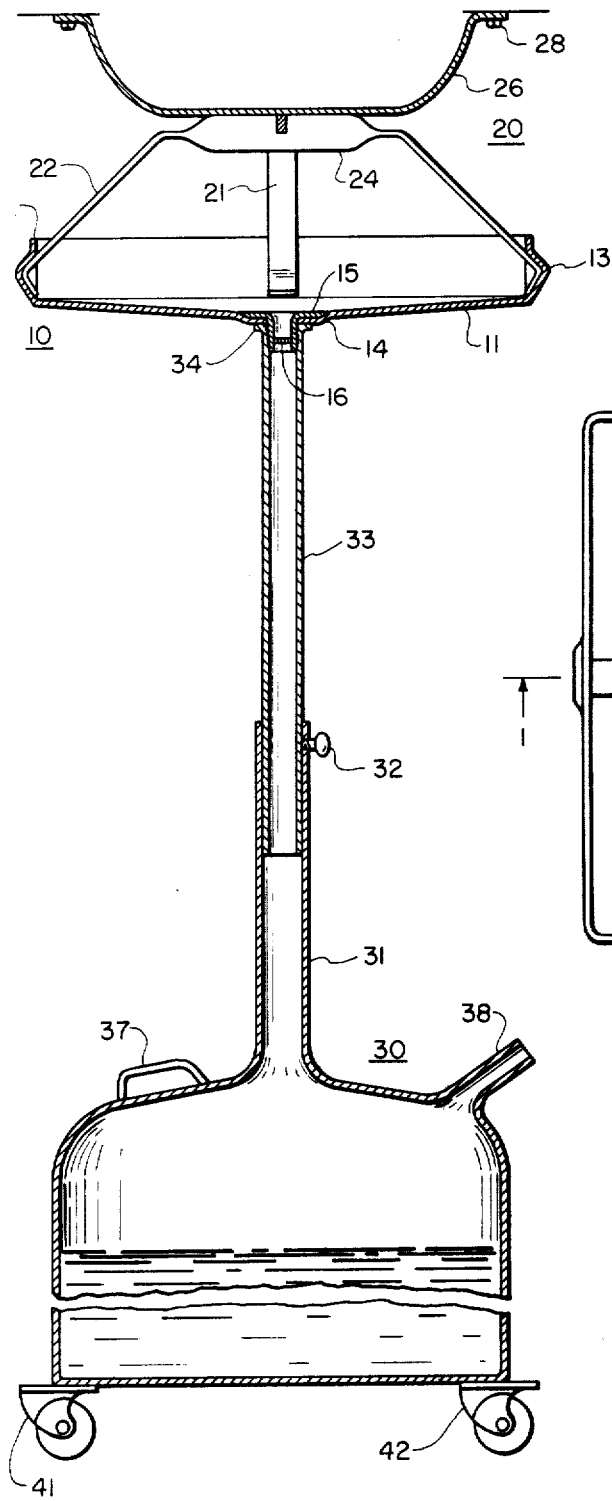
FIG. 1 shows a cross section of the subject device in operation.

Referring to the drawings, FIG. 1 shows a cross section of the device supported in a typical manner. A catch pan 10 has a bottom portion 11 and edge portions 12 that have recesses 13 for receiving the braces of a work holder 20. The catch pan may have a central indentation or depression 14 in the bottom portion, with a central drain hole through which a drain fitting 15 can be attached to a mounting tube 33, by means of screw threads 17, to secure and support the whole device. This is seen more clearly in FIG. 3. The drain fitting includes a strainer 16, and may have a removeable plug 18.

The work holder 20 comprises cross arms or braces 21 and 22 whose extremities engage the recesses 13 in the catch pan. The cross braces have flattened central portions 23 and 24, respectively, for supporting a typical portion of the underbody of a car, such as an automatic transmission oil pan 26, which is secured to the rest of the transmission by bolts 28.

A storage container 30 has a vertical receiving tube 31 with a lock screw 32 for securing the mounting tube 33 whose upper end is coupled to the catch pan. This coupling includes a flange or washer 34 where it engages and supports the catch pan. The storage container may also have a handle 37 and a pouring spout 38. Wheels or castors 41 and 42 may provide mobility in a well known manner.

Figure 2:
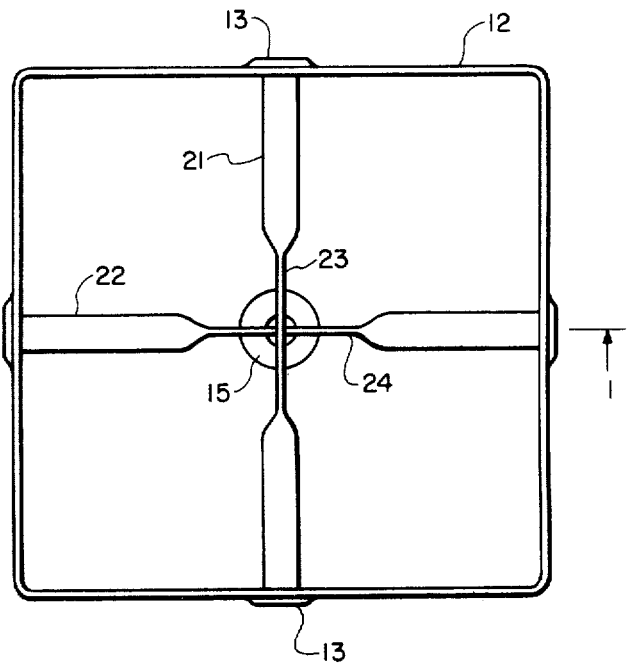
FIG. 2 shows a view of the work holder and catch pan from above.

FIG. 2 shows a plan view looking down on the work holder and catch pan, and has the same reference numbers for the same elements that are already described in the other figures.

Figure 3:
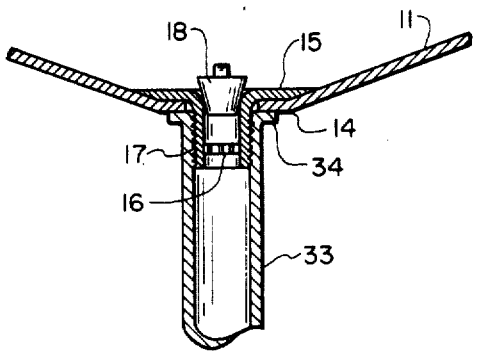
FIG. 3 shows an enlarged cross section of the mounting of the catch pan.

FIG. 3 shows an enlarged cross section of the coupling between the bottom portion 11 of the catch pan and the mounting tube 33. This figure also shows, more clearly, typical screw threads 17 between the drain fitting 15 and the mounting tube 33 that may be used to secure the catch pan to the mounting tube.

In the typical coupling between the catch pan and the mounting tube shown here, the flanged, threaded drain fitting screws into the mounting tube, which may have a metal washer or flange 34 to provide better support for the catch pan and work holder. Gaskets, of well known types, now shown, may be included between the flange of the drain fitting, or the washer, and the bottom of the catch pan to avoid leakage.

In operation, the complete assembly, as seen in FIG. 1, is wheeled under a car or the like, until the work holder 20 is directly under a portion of the car to be serviced. The lock screw 32 is then released and the upper mounting tube 33 is raised until the flattened central portions 23 and 24 of the work holder engage the desired portion of the car. At this point, the lock screw is tightened to hold the assembly in position.

If it is desired to work on, or to provide routine maintenance on, an automatic transmission, for example, the mounting bolts 28 can then be unloosened by a single mechanic to release the transmission oil pan 26.

Any excess oil or grease from the transmission will fall into the catch pan with a minimum of mess for the mechanic or the floor of the garage. The mounting tube may be lowered for working on the transmission, or the oil in the transmission pan may be dumped into the catch pan, or the whole assembly may be moved away at the convenience of the mechanic.

It should be noted that this whole operation can be handled by one mechanic, whereas without this device, it would take two mechanics, one to support the transmission oil pan and the other to loosen the bolts, to perform the same operation. It should also be noted that there would be extra time lost in the cleaning up of the floor of the garage with the inevitable spillage after any such operation.

There is a real need for this device for working on automatic transmissions and the like, but its use is not limited to such operations. The large collecting area of the catch pan and the access space above it would make this device useful for servicing brake drums, differentials, or radiators, etc., where there may be a substantial spillage of liquids, or risk of losing small parts.

The work holder, accordingly, may be removeable and is not limited to the typical shape or structure shown in FIGS. 1 and 2. It may be formed to accommodate the configuration of any special oil pan or other structure under a car. The work holder must extend far enough above the catch pan to permit access for whatever must be done, however, if the work holder is too high, there will be other disadvantages and problems. If necessary, a variable-height work holder can be provided.

This work holder is shown clipped into the catch pan, and can easily be snapped out for cleaning or replacement with another unit of the same or another shape. Other means, both separable and inseparable, for coupling the work holder to the catch pan, will suggest themselves to anyone skilled in the art. Clamps may be used to make a more rigid contact between the catch pan and the work holder, or they may be bolted together. The main factor in the combination of work holder and catch pan is that no part of the work holder projects beyond the edges of the pan so that all oil spillage will, ultimately, drain into the pan.

The typical catch pan shown in FIG. 2 is square, for convenience in manufacture; in this case by cutting, folding, and welding a piece of sheet metal. However, the pan could be almost any shape and could be stamped, or molded, or made in any well known manner. As noted earlier, the pan must be large enough to extend beyond the edges of the portion of the car being worked on, and must be strong enough to support the work holder, as well as the portion of the car being worked on, and any liquids in the pan.

The mounting tube 33 should be of a standard size to fit into the vertical receiving tube of a standard container. This will normally be strong enough to support the catch pan and the work holder when suitably secured by the drain fitting. However, in special circumstances, additional reenforcements may be necessary. If the mounting pipe and the bottom of the catch pan are not strong enough to support a large and heavy unit, additional braces can be added in a well known manner, to support any portion of the overall device.

The storage container may be one of the available types for use with a small funnel-like structure for catching crankcase oil. Some of the receiving tubes of these containers are of a standard, fairly-large size, and could be adapted to receive the mounting tube 33 without any modifications, except, possibly, a stronger lock screw 32. The base, including the wheels 41 and 42, must, of course, be wide enough and strong enough to accommodate the higher and heavier structure of the subject device.

If the lock screw 32 does not appear to be strong enough to support this device, additional or heavier lock screws may be provided. In addition, levering or jacking devices of well-known types may also be adapted to the moveable coupling between the receiving tube and the mounting tube to provide better support, or more easily and precisely controllable motion between the two.

The plug 18 would be convenient for containing any liquids that spill into the catch pan, in the event that they may be reuseable, or that they should be studied to observe color, consistency, or any other significant characteristic or contents. Similarly, the strainer 16 is desirable for catching nuts and bolts or small tools, etc., that may have fallen into the catch pan during the operation.

It is to be understood that I do not desire to be limited to the exact details of construction shown and described, for obvious modifications will occur to a person skilled in the art.

What is claimed is:

1. A device for servicing a fluid-containing portion of a vehicle comprising:

a catch pan, substantially larger than said fluid-containing portion of said vehicle, having a centrally-located drain hole;

a work holder fitted into said catch pan, and extending substantially above said catch pan, said work holder having a central portion for supporting said fluid-containing portion of said vehicle;

means for securing said work holder within said catch pan;

means for supporting said catch pan and work holder in a desired relationship with said fluid-containing portion of said vehicle; and means for catching any residue from said centrally-located drain hole of said catch pan.

2. A device as in claim 1 wherein said means for supporting said catch pan, and said means for catching any residue comprise a hollow mounting tube;

means for rigidly coupling said mounting tube to said catch pan through said centrally-located drain hole;

a container having a hollow receiving tube extending upwardly; and means for moveably securing said mounting tube within said receiving tube.

3. A device as in claim 2 including means for adjusting the height of said catch pan and work holder assembly with respect to said container.

4. A device as in claim 2 wherein said means for rigidly coupling said mounting tube to said catch pan comprises a flange around the upper end of said mounting tube to support the under side of said catch pan;

a drain fitting extending through said drain hole into the upper portion of said mounting tube, said drain fitting having an upper flange to secure the upper side of said catch pan; and a threaded lower portion on said drain fitting to engage corresponding threads on said upper portion of said mounting tube.

5. A device as in claim 1 wherein said catch pan has a bottom portion that is sloped downwardly to said centrally located drain hole, and side portions that extend upwardly around the periphery of said bottom portion.

6. A device as in claim 5 wherein said work holder consists of a plurality of cross braces extending upwardly from said side portions of said catch pan to a central area that has the configuration of the bottom of said fluid containing portion of said vehicle.

7. A device as in claim 6 wherein said means for securing said work holder within said catch pan comprises a plurality of indentations in said side portions of said catch pan, each one of said indentations receiving a corresponding one of the extremities of said cross braces of said work holder.

8. A device as in claim 1 wherein said work holder is removeable from said catch pan.

9. A device as in claim 1 including means for adjusting the height of said work holder with respect to said catch pan.

* * * * *